United States Patent
Strauch et al.

(10) Patent No.: US 11,134,391 B2
(45) Date of Patent: Sep. 28, 2021

(54) GUIDED PLACEMENT OF A WIRELESS DEVICE FOR OPTIMUM PERFORMANCE

(71) Applicant: Cypress Semiconductor Corporation, San Jose, CA (US)

(72) Inventors: Paul Strauch, Pleasanton, CA (US); Kalyan Dharanipragada, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 217 days.

(21) Appl. No.: 16/360,218

(22) Filed: Mar. 21, 2019

(65) Prior Publication Data

US 2020/0245155 A1 Jul. 30, 2020

Related U.S. Application Data

(60) Provisional application No. 62/798,342, filed on Jan. 29, 2019.

(51) Int. Cl.
*H04W 16/18* (2009.01)
*H04W 24/02* (2009.01)

(52) U.S. Cl.
CPC .......... *H04W 16/18* (2013.01); *H04W 24/02* (2013.01)

(58) Field of Classification Search
CPC ...... H04B 17/23; H04B 17/27; H04B 17/318; H04B 17/3913; H04L 1/0026; H04L 1/20; H04L 1/0003; H04L 1/0009; H04L 27/2602; H04W 16/18; H04W 24/02; H04W 24/08

(Continued)

(56) References Cited

U.S. PATENT DOCUMENTS 8,972,247 B2 3/2015 Margalit et al.
9,071,344 B2 6/2015 Smee et al.
(Continued)

FOREIGN PATENT DOCUMENTS

WO 2013181439 A1 12/2013

OTHER PUBLICATIONS

International Search Report for International application No. PCT/US2019/058713 dated Jan. 9, 2020, 2 pages.
(Continued)

*Primary Examiner* — Melvin C Marcelo
*Assistant Examiner* — Natali Pascual Peguero (57) ABSTRACT

Techniques for guided placement of a wireless device are described herein. In an example embodiment, a wi-fi wireless device comprises a radio frequency (RF) transceiver coupled to a baseband processor. The RF transceiver is configured to receive an RF signal transmitted over a wireless channel and to convert the RF signal to a modulated digital signal. The baseband processor is configured to receive the modulated digital signal from the RF transceiver, extract a wireless packet from the modulated digital signal, and compute an Exponential Effective SNR Mapping (EESM) value based on the preamble of the wireless packet, where the computed EESM value indicates the quality of the wireless channel at the current location of the wireless device. The baseband processor is further configured to provide a quality indicator based on the EESM value for the current location of the wireless device.

20 Claims, 6 Drawing Sheets

(58) Field of Classification Search
USPC .................................................. 370/252, 254
See application file for complete search history.

(56) References Cited

U.S. PATENT DOCUMENTS

| | | | | |
|---|---|---|---|---|
| 9,992,690 | B2 | 6/2018 | Butchko et al. | |
| 2007/0040704 | A1* | 2/2007 | Smee .................. | H04B 1/7107 |
| | | | | 340/981 |
| 2009/0171658 | A1* | 7/2009 | Margalit ................ | G10L 19/22 |
| | | | | 704/229 |
| 2013/0122843 | A1 | 5/2013 | Sakai | |
| 2015/0103685 | A1* | 4/2015 | Butchko .............. | H04L 41/147 |
| | | | | 370/252 |
| 2018/0026755 | A1* | 1/2018 | Meng ................... | H04L 1/1812 |
| | | | | 370/429 |

OTHER PUBLICATIONS

Written Opinion of the International Searching Authority for International application No. PCT/US2019/058713 dated Jan. 9, 2020, 7 pages.

* cited by examiner

GUIDED PLACEMENT OF A WIRELESS DEVICE FOR OPTIMUM PERFORMANCE

PRIORITY

This application claims the priority and benefit of U.S. Provisional Application No. 62/798,342, filed on Jan. 29, 2019, which is incorporated by reference herein in its entirety.

TECHNICAL FIELD

This disclosure relates to wireless communications over IEEE 802.11 protocols.

BACKGROUND

IEEE 802.11 (wi-fi) standards have been developed to provide high throughput wireless local area networks (WLANs). Typically, wireless devices are configured to provide some visual indication (e.g., a visual icon on a screen) of the strength of the signal received over the wireless channel of a particular WLAN. For example, a signal strength indication may be based on the Received Signal Strength Indicator (RSSI) metric, which measures the power of the incoming signal at the wireless device. However, an RSSI-based indication may be misleading with regards to the actual quality of the wireless channel because the RSSI metric is based on an evaluation of an analog radio frequency (RF) signal, can include signal interference, and can mask deep fades in the channel that can cause transmission errors. Thus, such RSSI-based indication is not quite reliable when it comes to predicting and reflecting the quality (e.g., throughput) of the wireless channel to the wireless device.

DETAILED DESCRIPTION

The following description sets forth numerous specific details such as examples of specific systems, components, methods, and so forth, in order to provide a good understanding of various embodiments of the described techniques for guided placement of a wireless device for optimal wireless channel performance. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for guided placement of a wireless device for optimal wireless channel performance. Examples of such wireless devices include, without limitation, personal computers (e.g., laptop computers, notebook computers, etc.), mobile computing devices (e.g., tablets, tablet computers, e-reader devices, etc.), mobile communication devices configured for wi-fi operations (e.g., smartphones, cell phones, personal digital assistants, messaging devices, pocket PCs, etc.), wi-fi-enabled audio/video/data recording and/or playback devices (e.g., cameras, voice recorders, hand-held scanners, monitors, etc.), printed circuit board (PCB) modules configured for wi-fi operations, System-on-Chip (SoC) wi-fi semiconductor devices and multi-chip semiconductor packages, and other similar electronic or chip-level devices that can use wi-fi protocols and interfaces for communication.

As used herein, "wireless" ("wi-fi") packet, channel, protocol, interface, device, or system refers to a packet, channel, protocol, interface, device, or system that is compliant with one or more IEEE 802.11 standards, e.g., such as IEEE 802.11 a/g/n/ac/p/ax, or later, standards. (It is noted that a wireless device or system may also be a combo device that is compliant with other standards, such as Bluetooth, in addition to one or more of the IEEE 802.11 standards.) The IEEE 802.11 wireless standards have been developed to provide high throughput wireless local area networks (WLANs), e.g., such as high throughput (HT) and very high throughput (VHT) WLANs. For example, in a HT WLAN, a wireless device (also referred to as a "station", or STA) may be associated with an access point device (also referred to as AP), such as a wireless router, that operates in a 40 MHz wireless channel. In a VHT WLAN, a wireless device may be associated with an AP that operates in a 80 MHz wireless channel. A wireless channel is a range or band of frequencies established for communication between an AP and a STA. During transmissions, the wireless channel may be divided into multiple sub-carrier bands (sub-carriers) of a few hundred kHz (e.g., 300 kHz) each, and transmission data may be multiplexed onto the sub-carriers, e.g., by using orthogonal frequency division multiplexing (OFDM).

The quality of a wireless channel is typically indicated by its throughput (e.g., the amount of data, in bits-per-second, that is successfully received over the wireless channel), although other channel characteristics such as latency may also be used. The throughput of a wireless device can be very dependent on its location. As used herein, "location" refers to the physical position and/or the physical orientation of a wireless device. Moving the wireless device just a few inches could enhance the throughput (and hence, the quality) of the wireless channel considerably. However, a user typically has no guidance where to place the wireless device for better throughput.

Conventional approaches for placement guidance are typically based on the RSSI metric. However, the RSSI metric only measures the power of the incoming analog RF signal and does not distinguish a valid signal from any interference that may be present from other nearby devices, which can be significant in the unlicensed 2.4 GHz and 5 GHz bands. Further, the RSSI metric is prone to masking any deep fades that may exist on some, but not all, of the sub-carriers of the wireless channel. Thus, while a wireless device may provide a RSSI-based visual indication of the received RF signal's strength, such indication may be misleading with regards to the expected throughput (and hence, quality) of the wireless channel. For example, a high RSSI metric may be misleading if the RF signal of interest is dominated by nearby interference. Further, a high RSSI metric may be masking deep fades in the wireless channel, which can cause transmission errors and thus lower the channel throughput.

To address these and other issues with placement guidance for wireless devices, the techniques described herein provide for using an Exponential Effective SNR Mapping (EESM) metric to predict the quality (e.g., such as throughput) of a wireless channel to a wireless device. The EESM is a sophisticated metric that quantifies the quality of the wireless channel. The EESM metric is based on the signal strength of each sub-carrier of the wireless channel and weights the signal-to-noise ratio (SNR) of each sub-carrier in an exponential way. In this manner, the EESM metric takes into account the instant characteristics (e.g., such as deep fades) of the wireless channel and reflects a metric value that more accurately represents the throughput and overall quality of the channel. Further, use of the EESM metric as a predictor of channel quality can also provide better placement guidance for wireless devices with directional, polarized and/or switched antennas. (A switched-antenna device is a device with two or more antennas on one RF chain, so the device can select/switch to the antenna that provides better transmission quality.) Wireless devices with such antennas are very location-dependent when it comes to providing a good wireless communication because the physical position of a device and its orientation (e.g., the angle of its antenna with respect to the AP) can enhance the throughput of the wireless channel considerably.

In one example embodiment, a wireless device comprises a radio frequency (RF) transceiver and a baseband processor coupled to the RF transceiver. The RF transceiver is configured to receive an RF signal transmitted over a wireless channel and to convert the RF signal to a modulated digital signal. The baseband processor is configured to receive the modulated digital signal from the RF transceiver, to extract a wireless packet from the modulated digital signal, and to compute an EESM value based on the preamble of the wireless packet, where the EESM value indicates the quality of the wireless channel at the current location of the wireless device. The baseband processor is further configured to provide a quality indicator based on the EESM value for the current location of the wireless device. In some aspects of this embodiment, the wireless packet may be a Null Data Packet (NDP) or Protocol Data Unit (PPDU) packet. In order to compute the EESM value, in one aspect the baseband processor is further configured to look up a $\beta$ parameter value in a look-up table that stores pre-computed $\beta$ parameter values for multiple modulation-and-coding schemes (MCSs). In some aspects, in order to compute the EESM value, the baseband processor is configured to estimate a Signal-to-Noise Ratio (SNR) value for the wireless channel and to use a signal strength value for each sub-carrier of the wireless channel. In an example aspect, the baseband processor is configured to determine whether the wireless packet is valid (e.g., whether the wireless packet is sent specifically to the wireless device). In one aspect, the wireless device comprises a display and the quality indicator is displayed as a visual icon on the display. In another aspect, the wireless device comprises a bank of multiple Light Emitted Diodes (LEDs) and the quality indicator is displayed on the bank of LEDs. In some aspects, the baseband processor is further configured to periodically re-compute the EESM value. For example, the baseband processor may be configured to compute a new EESM value and to provide a new quality indicator based on the new EESM value, when the current location of the wireless device is changed. In another example, the baseband processor may be configured to compute a new EESM value and a new quality indicator based on pre-set time intervals and/or on the specific type(s) of the received wireless packet(s).

In another example embodiment, a method for guided placement of a wireless device with respect to a wireless channel comprises: receiving a first wireless packet over the wireless channel by the wireless device at a first location, where the first wireless packet includes a first preamble; computing a first EESM value based on the first preamble of the first wireless packet, where the first EESM value indicates a first quality of the wireless channel at the first location; providing a first quality indicator based on the first EESM value for the first location of the wireless device; receiving a second wireless packet over the wireless channel by the wireless device at a second location that is different from the first location, where the second wireless packet includes a second preamble; computing a second EESM value based on the second preamble of the second wireless packet, where the second EESM value indicates a second quality of the wireless channel at the second location; and providing a second quality indicator based on the second EESM value for the second location of the wireless device. In some aspects of this embodiment, one or both of the first and second wireless packets may be NDPs and/or PPDUs. In an example aspect, computing the first EESM value and computing the second EESM value may comprise looking up one or more $\beta$ parameter values for one or more respective MCSs. In one aspect, computing the first EESM value comprises estimating a first SNR value for the wireless channel, and computing the second EESM value comprises estimating a second SNR value for the wireless channel. In some aspects, computing the first EESM value and computing the second EESM value further comprise determining a signal strength value for each sub-carrier of the wireless channel. In an example aspect, the method further comprises determining whether the first wireless packet and/or the second wireless packet is valid (e.g., such as determining whether the wireless packet is sent specifically to the wireless device). In one aspect, providing the first quality indicator and providing the second quality indicator comprise displaying a visual icon on a display of the wireless device. In another aspect, providing the first quality indicator and providing the second quality indicator comprise driving a bank of multiple LEDs of the wireless device. In some aspects, the method may further comprise periodically computing a current EESM value that indicates a current quality of the wireless channel at a current location of the wireless device, where the periodicity of the computation may be based on pre-set time intervals and/or on the specific type(s) of the received wireless packet(s).

In another example embodiment, a method for placement of a wireless device with respect to a wireless channel comprises: receiving a wireless packet at the wireless device, where the wireless packet includes training field data (e.g., such as NDP or PPDU); computing, by the wireless device, an EESM value based at least on the training field data, where the EESM value indicates a quality of the wireless channel at a current location of the wireless device; and providing, by the wireless device, a quality/throughput indicator based on the EESM value for the current location of the wireless device. In one aspect of this embodiment, computing the EESM value comprises: looking up multiple β parameter values for multiple respective modulation-and-coding schemes (MCSs); computing multiple EESM values based on the multiple β parameter values; and selecting the highest of the multiple EESM values as the EESM value for the quality of the wireless channel at the current location of the wireless device. In another aspect, computing the EESM value comprises deriving the EESM value based on a SNR value of the wireless channel and on a signal strength value of each sub-carrier of the wireless channel, where the SNR value of the wireless channel may be estimated and/or the signal strength value of each sub-carrier of the wireless channel may be determined based on the same symbol in the training field data. In an aspect of this embodiment, the method may further comprise determining whether the wireless packet is valid or not. In one aspect providing the quality/throughput indicator may comprise displaying a visual icon on a display of the wireless device, while in another aspect providing the quality/throughput indicator may comprise driving a bank of multiple LEDs. In an aspect of this embodiment, the method may further comprise periodically re-computing the EESM value, where the periodicity of the computation may be based on pre-set time intervals and/or on the specific type(s) of the received wireless packet(s).

Figure 1:
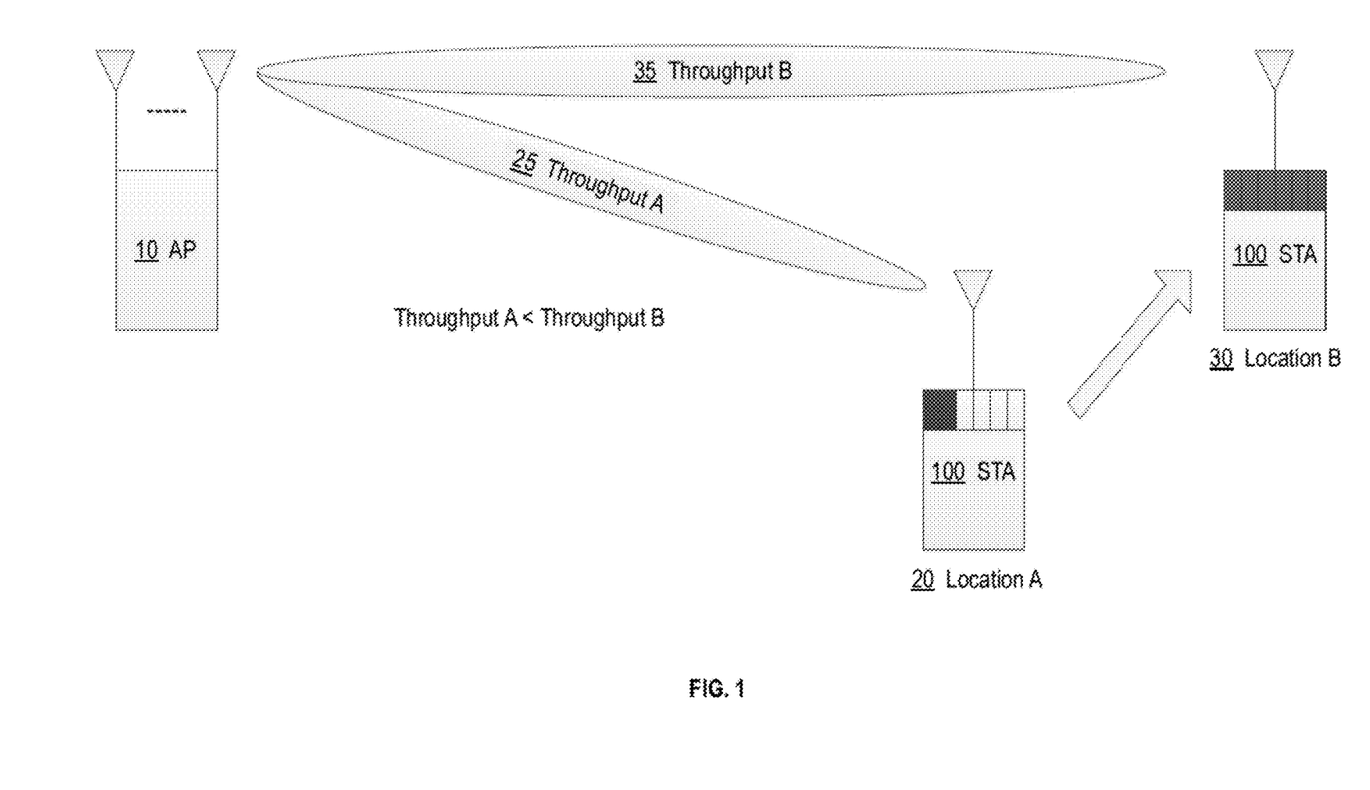
FIG. 1 illustrates an example operational context of the described techniques for guided placement of a wireless device, according to some embodiments.

FIG. 1 illustrates an example operational context of the techniques for guided placement of a wireless device described herein. Wireless device (STA) 100 is configured to communicate over a wireless channel with access point device (AP) 10. At location A (20), STA 100 computes an EESM value according to the techniques described herein, where the EESM value indicates the throughput A (25) at that location. Based on the computed EESM value, STA 100 provides a quality indicator to turn on two (out of six) of its LEDs. Subsequently, STA 100 is moved to location B (30). At location B (30), STA 100 computes a new EESM value according to the techniques described herein, where the new EESM value indicates the throughput B (35) at that location. Based on the new EESM value, STA 100 provides a quality indicator to turn on all six of its LEDs. Based on this visual indication, the user of wireless device 100 can easily determine that the throughput, and respectively the quality, of the wireless channel to AP 10 is much better at location B (30) than at location A (20). In general, a higher EESM value for a particular location indicates a higher quality of the wireless channel than locations with lower EESM values, and therefore indicates that a higher throughput can be achieved at that particular location. Thus, by moving wireless device 100 in FIG. 1 from location A (20) to location B (30), a user can easily determine by looking at the bank of LEDs that at location B the wireless device will experience a higher throughput than at location A. In this manner, the techniques described herein provide for a guided placement of the wireless device for optimum wireless channel performance.

It is noted that the operational context illustrated in FIG. 1 is merely an example. In some embodiments, the change from location A to location B may involve a change in the physical position of the device (e.g., such as a displacement in physical coordinates). In other embodiments, the change from location A to location B may involve only a change in the orientation of the wireless device (e.g., such as a change in the angle of its antenna with respect to the access point device) without changing its physical position. In some embodiments, the wireless device may provide the quality indicator as visual icon on a display (e.g., when the wireless device has a display). In other embodiments, the wireless device may provide the computed EESM value and/or the quality indicator to a smartphone or tablet—e.g., when the wireless device is a stationary device (such as a security camera or a printer, etc.) that does not have means, and/or is not suited, for providing visual indications. Thus, the operational context in FIG. 1 is to be regarded in an illustrative rather than a restrictive sense.

In some embodiments, the techniques described herein provide for computing a new EESM value at each new location of the wireless device, and for providing a new quality indicator and a new visual indication that is based thereon. Alternatively or in addition to, in some embodiments the EESM value may be computed periodically and a quality indicator based thereon may be shown continuously to the user. In various embodiments, the use of the EESM metric values in this manner may depend on the particular characteristics of the wireless device—its form factor, the particular use case, the environment (e.g., such as presence or absence of obstacles in the channel path). In some embodiments, the computed EESM value and/or the quality indicator based thereon may be exposed though an application programming interface (API) to end-user devices (e.g., smartphones, tablets, laptop/notebook computers, etc.) in order to provide maximum flexibility of use. In various embodiments, the visual indications provided to the user may be various wi-fi signal icons or wi-fi bar icons (e.g., for wireless devices with touch screens), or other types visual indications for wireless devices without displays (e.g., one or more LEDs that change colors).

Figure 2:
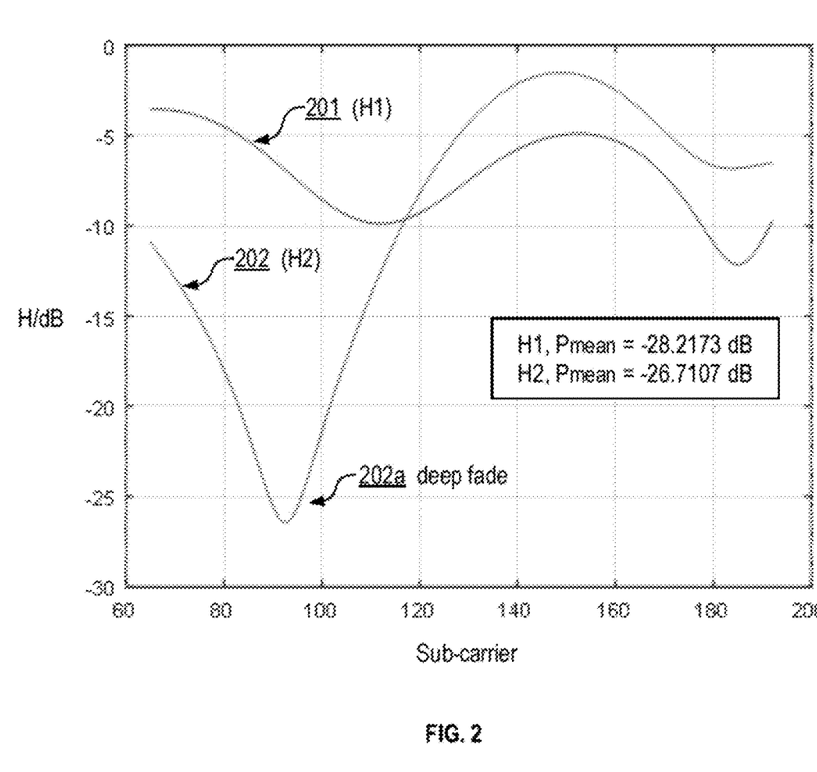
FIG. 2 illustrates a diagram of a simulation example of two signal realizations of the same wireless channel model.

Conventionally, the EESM metric is used in cellular communications to predict packet error rate (PER) for link rate adaptation schemes. In contrast to such conventional schemes that use EESM for PER prediction, the techniques described herein use the EESM metric for a different purpose—to guide the selection of a better location of a wireless device. Further, in contrast to conventional solutions that use the RSSI metric to indicate the strength of the received analog RF signal, the techniques described herein provide for computing and using the ESSM metric to provide a visual indication of the quality of the wireless channel configured at the wireless device. FIG. 2 illustrates the difference between the use of the RSSI and EESM metrics for prediction of channel performance.

In FIG. 2, a simulation example of two signal realizations (signals H1 and H2) on two wireless channels having the same channel model are plotted against the sub-carriers (along the x-axis) and the strength of the signal (along the y-axis) for each sub-carrier. The line graphs 201 and 202 indicate the average power of the respective signals H1 and H2 across the sub-carriers of the two respective wireless channels. Signal H1 has a mean power strength of −28.2173 dB, while signal H2 has a mean power strength of −26.7107 dB. Since line 202 indicates that signal H2 has a higher average power than signal H1, the RSSI value of signal H2 would be higher than the RSSI value of signal H1. However, line 202 shows a deep fade 202a (an example of a frequency selective channel characteristic), which may cause a wireless packet sent on the channel of signal H2 to fail. So even though signal H2 has almost 2 dB more in average power, its wireless channel would have less throughput than the channel of signal H1 because the bits sent on sub-carriers in deep fade 202a would be lost. It is noted that as used in accordance with the techniques described herein, the EESM metric does not have this problem because it accounts for the quality of the wireless channel across all of its sub-carriers. Thus, signal H1 would have a better EESM metric value that signal H2, and therefore the channel of signal H1 would have better quality (e.g., throughput) than the channel of signal H2.

According to equation (1), the ratios of $\gamma_i$ to $\beta$ are summed in an exponential way and the sum is averaged across the N sub-carriers. In effect, the EESM value $\gamma_{eff}$ reflects a non-linear scale of the average power across the sub-carriers for the particular symbol in the received packet. Thusly computed, the EESM value accounts for the SNR of the particular symbol across the entire channel, but the effects of any outside signal interferences and fades in the wireless channel have been eliminated. Further, the $\beta$ parameter is MCS-dependent, which allows for fine-tuning of the EESM value depending on the MCS that is being selected for use. The EESM value computed in this manner effectively maps the instantaneous state of the wireless channel into a singular value that indicates the quality of the channel. According to the techniques described herein, the computed EESM value is then used to generate a quality indicator which in turn is used to indicate a good or bad location of the underlying wireless device.

In various embodiments, different values of the $\beta$ parameter may be pre-determined for a specific wireless device in order to account for that device's characteristics such as form factor, type of antenna, processing power (e.g., type of CPU), etc. Table 1 below illustrates how various $\beta$ parameter values may be used for various MCS when the EESM metric is used to predict the quality (e.g., such as throughput) of a wireless channel at a given location.

TABLE 1

Example Throughput Predictions per MCS

Throughput/Mbps ≈ (1 − PER) Rate$_{MCS}$ (1 − Overhead)

| EESM/dB | MCS0 $\beta_0 = 1.8$ | MCS1 $\beta_1 = 4.1$ | MCS2 $\beta_2 = 5.0$ | MCS3 $\beta_2 = 18.3$ | MCS4 $\beta_2 = 21.5$ | MCS5 $\beta_2 = 59.0$ | MCS6 $\beta_2 = 73.0$ | MCS7 $\beta_7 = 78.0$ |
|---|---|---|---|---|---|---|---|---|
| 1 | 10 | 0 | 0 | 0 | 0 | 0 | 0 | 0 |
| 2 | 15 | 12 | 5 | 0 | 0 | 0 | 0 | 0 |
| 3 | 16 | 20 | 15 | 5 | 0 | 0 | 0 | 0 |
| . | | | | | | | | |
| . | | | | | | | | |
| . | | | | | | | | |
| 20 | 16 | 22 | 30 | 30 | 30 | 30 | 30 | 50 |

According to the techniques described herein, the EESM metric value is computed according to equations (1) and (2) below:

$$\gamma_{eff} = -\beta \ln\left(\frac{1}{N}\sum_{i=1}^{N} e^{\frac{-\gamma_i}{\beta}}\right) \quad (1)$$

$$\gamma_i = |H_i|^2 SNR \quad (2)$$

In equation (1), $\gamma_{eff}$ is the EESM value that is computed across a particular symbol in the preamble of a wireless packet received on the wireless channel, N is the number of sub-carriers on the wireless channel, $\beta$ is a parameter value that is pre-computed for each Modulation and Coding Scheme (MCS) that can be used on the wireless channel, and $\gamma_i$ is the signal strength (or power) computed for each sub-carrier according to equation (2). In equation (2), $|H_i|^2$ is the square of the signal strength measured (or otherwise derived) on the $i^{th}$ sub-carrier, and the SNR value is the signal-to-noise ratio that is estimated across the wireless channel for the particular symbol in the preamble of the received packet.

In Table 1, the $\beta$ parameter values have been computed based on simulations performed for some example embodiments. In the simulations, wireless channel modules were used to sweep through different symbol realizations, and EESM values were generated based on the signal strength $H_i$ for each $i^{th}$ sub-carrier of the simulated channel. The generated EESM values were then matched against various MCSs by trying various $\beta$ parameter values on an additive white Gaussian noise (AWGN) model that is used as a reference curve. For the purpose of computing the $\beta$ parameter values, the simulations ensure in this manner that the EESM value is only impacted by white noise but not by any fades.

Table 1 also shows the MCSs that are most commonly used in wi-fi communications for symbol modulation and for data bit encoding. Wireless devices operating on VHT WLANs may use various rate adaptation mechanisms to select the best MCS under the given operating conditions of the device. For example, such rate adaptation mechanisms may be configured to select the highest possible MSC (because it provides the highest throughput), while accounting for high noise, weak signal, or any fades in the channel. Of the MCSs listed in Table 1, MCS0 is the most robust scheme since it uses binary phase shift keying (BPSK) modulation with only one bit encoded per symbol, while MCS1 uses quadrature phase shift keying (QPSK) modulation with 4 bits encoded per symbol, etc. Thus, MSC0 needs a lower β parameter value than MCS1 because it requires a much lower SNR for proper operation. The techniques described herein provide for pre-computation of the β parameter value for each MCS, which allows the fine-tuning of the computed EESM metric. Further the techniques described herein provide for storing the pre-computed β parameter values in a look-up table (LUT) in the wireless device, which allows these parameter values to be dynamically selected during operation of the device.

In various embodiments, the techniques described herein provide for using the preambles of various types of wireless packets to compute an EESM value and to provide a quality indicator based thereon. For example, in some embodiments a wireless device may be configured to continuously compute EESM values based on the preambles of any received PPDUs and to provide a quality indicator based thereon in a continuous manner. In some embodiments, a wireless device may be configured to compute an EESM value based on the preamble(s) of any received NDP(s), where the NDPs may be transmitted from an access point in repetitive way within a certain time window (e.g., during set-up or configuration) in order to allow a user to find the best location for a wireless device (e.g., during the installation of a security camera).

Figure 3A:
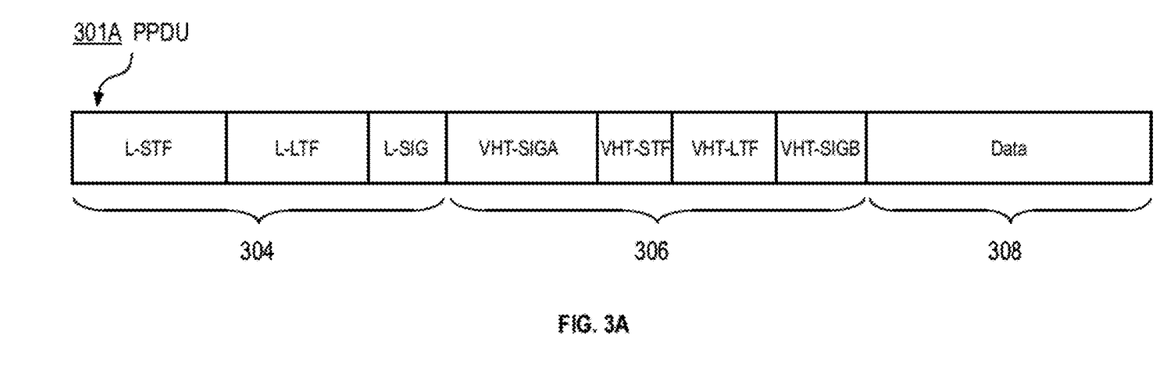
FIG. 3A illustrates the structure of a Protocol Data Unit (PPDU) wireless packet, which can be used for guided placement of a wireless device in some embodiments.

FIG. 3A illustrates the structure of a PPDU packet. PPDU 301A includes a legacy preamble field 304, a VHT preamble field 306, and data field 308. Legacy preamble field 304 includes three preamble segments—a short training field (L-STF), a long training field (L-LTF), and a signal field (L-SIG). The legacy preamble segments store training symbols (sets of one or more bits having the digital values of "−1" or "1"), which are used by IEEE 802.11ax and all pre-802.11ax protocols for packet detection (also referred to as frame detection). The data stored in the L-STF and L-LTF segments is used for packet identification and front-end synchronization, and the L-SIG segment stores the data rate and length of the packet in unit of bytes. VHT preamble field 306 includes the VHT-SIGA, VHT-STF, VHT-LTF, and VHT-SIGB segments, which store additional VHT format-specific training and signaling. The VHT-SIGA segment stores the actual rate value, channel coding, guard interval, Multiple-Input Multiple-Output (MIMO) scheme, and other configuration details for a VHT-formatted packet. The VHT-STF segment stores a symbol that is used to improve automatic gain control estimation in a MIMO transmission. The VHT-LTF segment stores symbols used for MIMO channel estimation and pilot subcarrier tracking. The VHT-SIGB segment stores a symbol used to set up the data rate and to fine-tune MIMO reception in multiuser scenario. Data field 308 stores the payload of PPDU 301A, which may include service bits, a service data unit, tail bits, and pad bits.

Figure 3B:
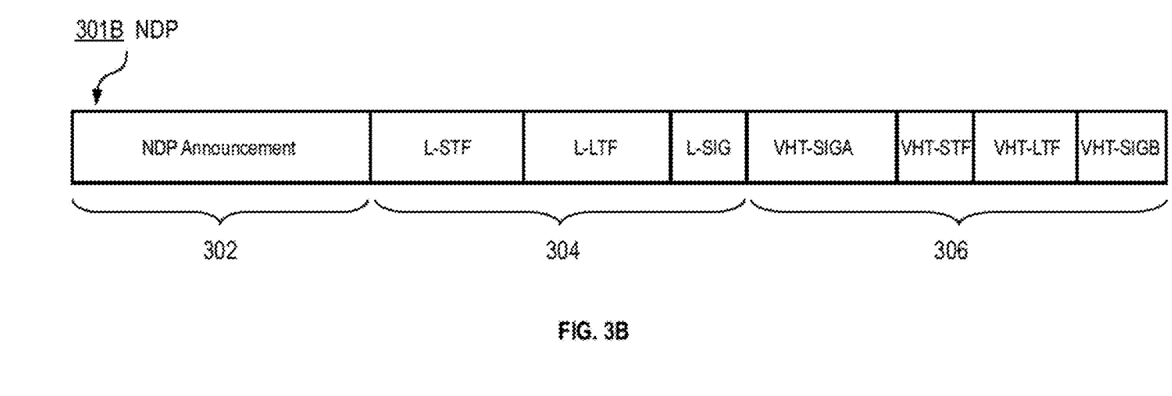
FIG. 3B illustrates the structure of Null Data Packet (NDP) wireless packets, which can be used for guided placement of a wireless device in some embodiments.

FIG. 3B illustrates the structure of two NDP packets, which are sent together during the process of beamforming. (Beamforming is transmission process that focuses the transmission energy toward a receiver.) NDP packets 301B include an NDP announcement packet 302 followed by a NDP packet that includes a legacy preamble field 304 and a VHT preamble field 306. NDP announcement packet 302 stores control information for the intended beamformee. The legacy preamble field 304 and the VHT preamble field 306 have the same format and store the same information as the corresponding preamble fields of PPDU 301A. NDP packets 301B do not carry any payload and thus do not include any data fields.

Figure 4:
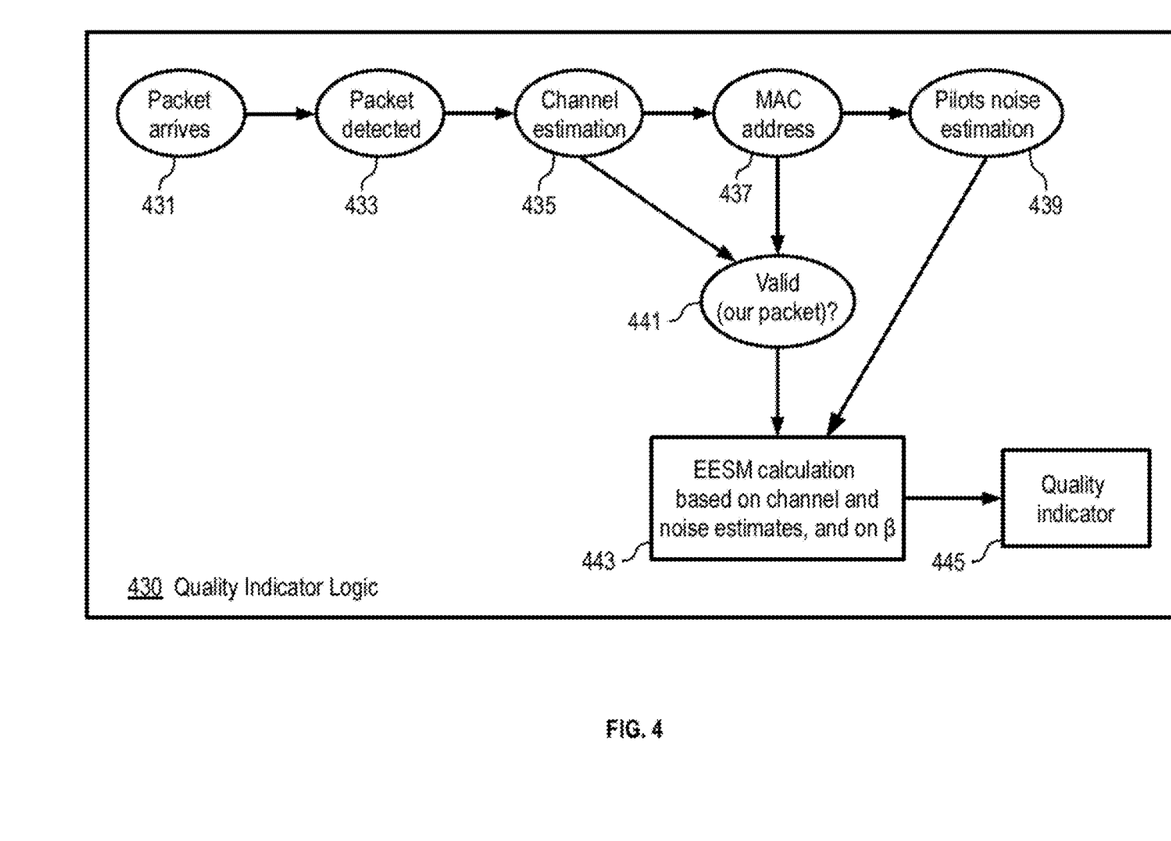
FIG. 4 illustrates a schematic diagram of a quality indicator logic for guided placement of a wireless device, according to example embodiments.

FIG. 4 illustrates a schematic diagram of the operational flow of a quality indicator logic configured for guided placement of a wireless device, according to example embodiments. As used herein, "logic" refers to a hardware block having one or more circuits that include various electronic components configured to process analog and/or digital signals and to perform one or more operations in response to control signal(s) and/or firmware instructions executed by a central processing unit (CPU). Examples of such electronic components include, without limitation, transistors, diodes, logic gates, and various arrays and circuits thereof. In various embodiments, a quality indicator logic may be implemented as a state machine, application-specific circuits, and/or as other logic block(s) and analog/digital circuitry that may be configured to control hardware in response to control signals and/or firmware instructions. For example, quality indicator logic 430 in FIG. 4 may be implemented as a state machine that is configured to perform a series of states (operations) on a received wireless packet. The states in quality indicator logic 430 are implemented in baseband physical layer (PHY) hardware (e.g., logic gates, registers, and other hardware circuitry operating in the digital domain) that passes signals from state to state and manages the flow.

During operation of a wireless device, an analog RF signal is received on a wireless channel and is converted into a modulated digital signal. A wireless packet is extracted from the modulated digital signal, and quality indicator logic 430 of the wireless device is notified of the received packet (state 431). For example, a baseband processor logic (not shown) may receive and process the modulated digital signal and may notify quality indicator logic 430 accordingly by using a suitable mechanism (e.g., a register, shared memory, etc.) A correlator block correlates on the STFs of the received packet (state 433). A channel estimator block estimates (or otherwise determines) the signal strength for each sub-carrier of the wireless channel and sends the channel estimate data to a validation block of quality indicator logic 430 (state 435). The channel estimate data may also include both phase and amplitude of individual OFDM sub-carriers, to capture the interference caused by shape and/or composition of various objects in the vicinity of the wireless device. An address block extracts (or otherwise determines) the media access control (MAC) address of the received packet and sends the address data to the validation block (state 437). A noise estimation block estimates the SNR of the wireless channel and sends the SNR data to the EESM calculation block of quality indicator logic 430 (state 439). The validation block uses the channel estimate data and the address data to determine whether the received packet is a valid packet (e.g., whether the packet is not noise or interference and/or whether the packet belongs on the wireless channel to the wireless device) and, if the packet is valid, passes the channel estimate data to the EESM calculation block (state 441). The EESM calculation block looks up in a LUT the β parameter value of the MCS selected for the wireless packet and computes an EESM value based on the channel estimate data, the SNR data, and the β parameter value in accordance with equations (1) and (2) above (state 443). In some embodiments, the computed EESM value may be the average of (or otherwise derived from) several EESM values that may be computed based on multiple symbols from the preamble of the same packet and/or on symbol(s) from the preambles of multiple packets. The computed EESM value is passed to a quality indicator block, which determines the quality indicator that is output from quality indicator logic 430 (state 445). The output quality indicator may be the computed EESM value itself, or may be some other data value or values that are derived from (or based on) the computed EESM value.

For example, in some embodiments the computed EESM value may be provided as a throughput indicator to a host application via a host interface of the wireless device. In these embodiments, the host application may be configured on the wireless device itself or on a separate device that is communicatively coupled to the wireless device. In other embodiments, in state 445 the quality indicator logic 430 may compare the computed EESM value against data ranges that are pre-determined to indicate the channel quality (e.g., a good, medium, or bad), and may output a quality indicator value that corresponds to the determined quality of the wireless channel. The quality indicator value may then be provided (e.g., through a suitable API) to an application of the wireless device, which may set a corresponding wi-fi signal icons or wi-fi bar icons (e.g., for a wireless device with a display) or other types visual indications such as LEDs (for a wireless device without a display).

In this manner, the techniques described herein provide for predicting the quality (e.g., the throughput) of a wireless channel based on the EESM metric, which is computed based on training field data in the preamble of a wireless packet, such as PPDU or NDP packets. Such training field data may be obtained from legacy preambles, as well as VHT preambles. Thus, for predicting the channel quality, it is sufficient for an AP to transmit, and for the wireless device to receive, wireless packets that may only contain preambles and no data.

Figure 5:
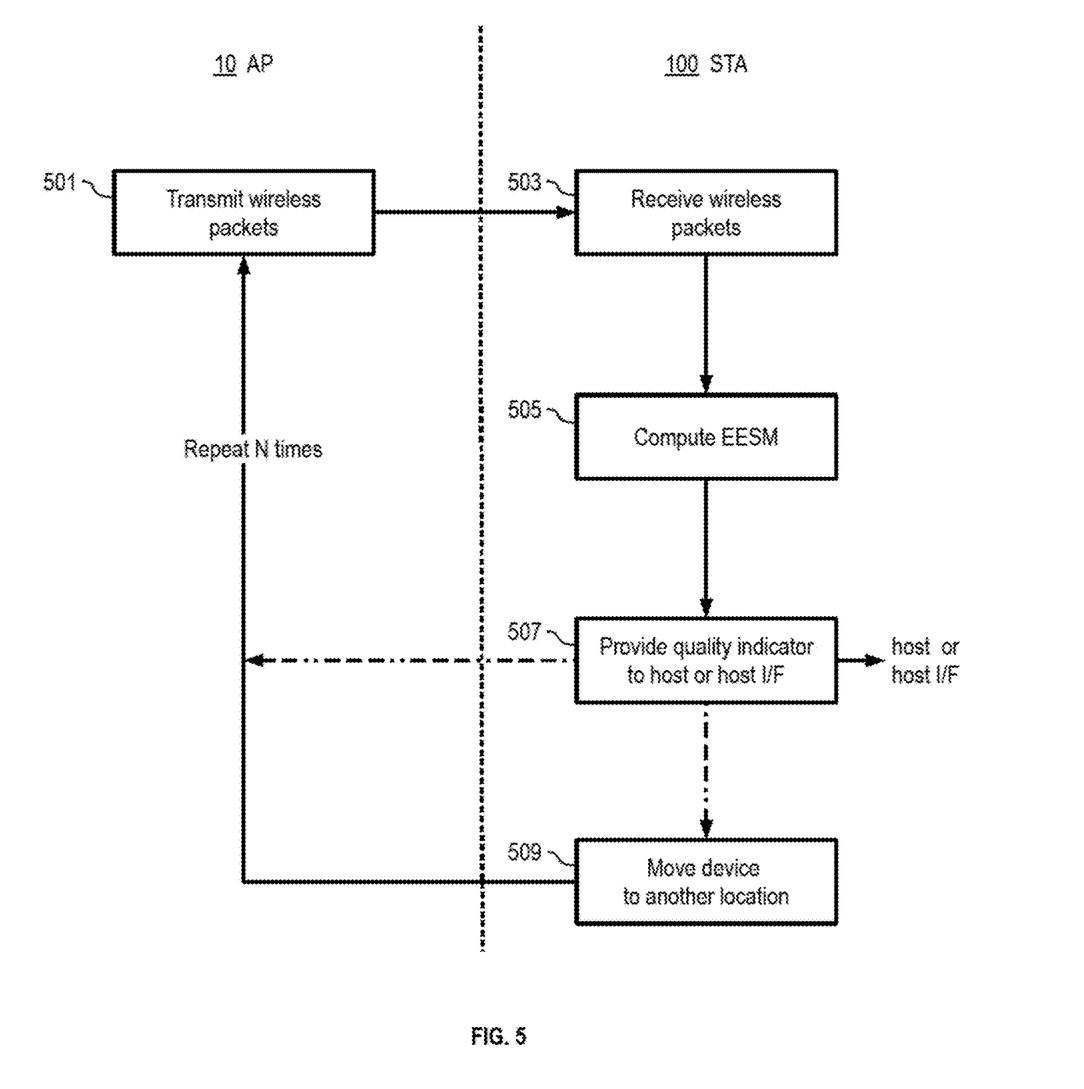
FIG. 5 illustrates a flow diagram of a method for guided placement of a wireless device, according to example embodiments.

FIG. 5 illustrates a flow diagram of a method for guided placement of a wireless device. The operations of the method in FIG. 5 are described as being performed by an access point device (AP) 10 and by a wireless device (STA) 100 with a quality indicator logic thereof in accordance with an example embodiment. It is noted, however, that various implementations and embodiments may use various, and possibly different, components to perform the operations of the method in FIG. 5. For example, in various embodiments a system-on-chip (SoC) wi-fi device or a single chip wi-fi/Bluetooth combo device may be configured with firmware instructions which, when executed by one or more processors or other hardware components (e.g., microcontrollers, state machines, and the like), are operable to perform the operations of the method in FIG. 5. In another example, in various embodiments an integrated circuit (IC) device may include a single-chip or multi-chip wi-fi controller configured to perform the operations of the method in FIG. 5. Thus, the description hereinafter of the method in FIG. 5 as being performed by a wireless device and/or logic thereof, is to be regarded in an illustrative rather than a restrictive sense.

In operation 501, AP 10 transmits wireless packets to STA 100 over a wireless channel. For example, in some embodiments AP 10 may configured to send PPDU packets or other types of wireless packets that carry suitable training data in its preamble fields. In some embodiments, AP 10 may be placed in beamforming mode to send out NDP packets on the wireless channel. Since some channel vectors may become stale in the process of beamforming, AP 10 is configured to periodically send out the NDP packets and to receive feedback from STA 100. This allows STA 100 to receive a sufficient number of NDP packets for computing enough EESM values in accordance with the techniques described herein.

In operation 503, STA 100 receives wireless packets from AP 10 on the wireless channels. For example, a transceiver in STA 100 receives an analog RF signal and converts it to a modulated digital signal that is send to a baseband processor, which extracts the wireless packets therefrom.

In operation 505, STA 100 computes an EESM value based on one or more of the received wireless packets in accordance with the techniques described herein. For example, a quality indicator logic in STA 100 validates a received packet and estimates (or otherwise determines) the signal strength for each sub-carrier of the wireless channel across a selected symbol in the preamble of the received packet. The quality indicator logic also estimates the SNR of the wireless channel and uses a LUT to find the $\beta$ parameter value of the MCS for the received packet. The quality indicator logic then computes an EESM value based on the signal strength of each subcarrier, the SNR data, and the $\beta$ parameter value in accordance with equations (1) and (2) above.

In operation 507, STA 100 provides a quality indicator to a host (or an application running thereon), which may be configured on or off-chip. For example, in some embodiments the quality indicator logic of STA 100 may send to the host the computed EESM value itself as the quality indicator value. In some embodiments, the quality indicator logic may convert the computed EESM value into a quality indicator value that corresponds to the channel quality (e.g., a good, medium, or bad). Based on the quality indicator value, the host may set a corresponding wi-fi signal icons or wi-fi bar icons (e.g., if STA 100 has a display) or other types visual indications such as LEDs (e.g., if STA 100 does not have a display).

After operation 507, the method may proceed with being repeated multiple times with AP 10 sending, and STA 100 receiving, additional wireless packets. Alternatively, or in addition, the method may be repeated after STA 100 is moved to a different location (operation 509). The change in the location of STA 100 may involve a change in the physical position of STA 100 and/or a change in the orientation of STA 100 or its antenna with respect to AP 10. In this manner, repeating operations 503, 505, and 507 comprises periodically computing a new EESM value that may correspond to a new location of STA 100.

In some embodiments, the method in FIG. 5 may be used for selecting a place for a location-fixed wireless device (e.g., such as a security camera). Once the location-fixed device has been installed, a new EESM value may be re-computed when location-related circumstances change (e.g., when a source of interference is disposed in proximity). In some embodiments, a wireless device may use the beacons sent from the AP (with data or not) to periodically compute EESM values that represent the quality of the wireless channel. For example, a wireless device can use the training symbols in the preambles of beacon or data packets and continuously estimate the EESM values with subsequent visualization on the wireless device. In this manner, the wireless device can have a continuously updated quality visualization (e.g., such as a wi-fi bar or wi-fi signal icon).

Figure 6:
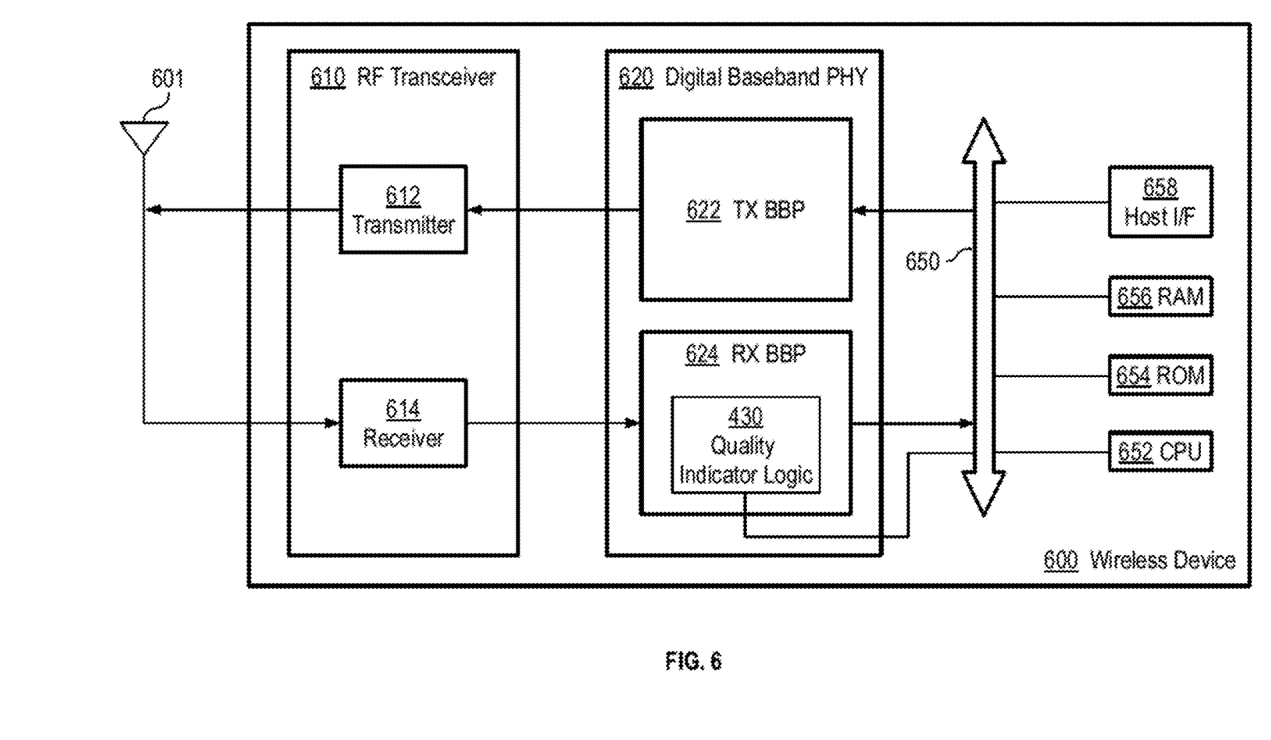
FIG. 6 illustrates a schematic diagram of an example wireless device, in accordance with some embodiments.

The techniques for guided placement of a wireless device described herein may be implemented on various types of portable wireless devices that contain wi-fi chipsets. FIG. 6 illustrates an example wireless device that is configured in accordance with the techniques described herein. In the embodiment illustrated in FIG. 6, wireless device 600 may be a single-chip IC device manufactured on a semiconductor die or a single-chip IC that is manufactured as a System-on-Chip (SoC). In other embodiments, wireless device 600 may be a multi-chip module encapsulated in a single semiconductor package. Thus, wireless device 600 in FIG. 6 is to be regarded in an illustrative rather than a restrictive sense.

Wireless device 600 includes CPU 652, read-only memory (ROM) 654, random access memory (RAM) 656, host interface 658, digital baseband PHY 620, and RF transceiver 610. CPU 652, ROM 654, RAM 656, host interface 658, and digital baseband PHY 620 are coupled to one or more busses 650. Digital baseband PHY 620 is also coupled to RF transceiver 610, which is coupled to at least one antenna 601. In some embodiments, the antenna may be integrally formed or incorporated on the same IC chip with the rest of the components of wireless device 600 or may be disposed on a separate chip or substrate. Alternatively, the antenna may be separately connected to a printed circuit board (PCB) to which wireless device 600 is mounted or attached.

CPU 652 includes one or more processing cores configured to execute instructions that may be stored in ROM 654, RAM 656, or flash memory (not shown). ROM 654 is read-only memory (or other suitable storage medium) that is configured for storing boot-up routines, configuration parameters, and other firmware parameters and settings. RAM 656 is volatile memory that is configured for storing data and firmware instructions accessed by CPU 652. A flash memory, if present, may be embedded or external non-volatile memory (e.g., NAND flash, NOR flash, etc.) that is configured for storing data, programs, and/or other firmware instructions.

Host interface 658 may include control registers, data registers, and other circuitry configured to transfer data between digital baseband PHY 620 and a host (not shown). The host may be a microcontroller subsystem disposed on-chip or may be an off-chip IC device. The host may include its own CPU that is operable to execute host applications or other firmware/software configured (among other functions) to receive and process quality indicators in accordance with the techniques described herein.

Bus(es) 650 may include one or more buses such as a system interconnect and a peripheral interconnect. The system interconnect may be a single-level or multi-level Advanced High-Performance Bus (AHB) that is configured as an interface that couples CPU 652 to the other components of wireless device 600, as well as a data and control interface between the various components and the peripheral interconnect. The peripheral interconnect may be an Advanced eXtensible Interface (AXI) bus that provides the primary data and control interface between CPU 652 and its peripherals and other resources (e.g., system resources, input/output (I/O) blocks, direct memory access (DMA) controllers, etc.), which may be programmed to transfer data between peripheral blocks without burdening the CPU.

Digital baseband PHY 620 includes various logic blocks and circuitry configured to process signals and data that are transferred between RF transceiver 610 and various components coupled to the one or more buses 650. Digital baseband PHY 620 includes TX BBP 622 and RX BBP 624. TX BBP 622 includes circuitry configured to receive digital data (e.g., a series of bytes) from other components in wireless device 600 and to convert the received data into a modulated digital signal that is send to RF transceiver 610. RX BBP 624 includes circuitry configured to receive a modulated digital signal from RF transceiver 610 and to convert the received signal into digital data.

RF transceiver 610 includes various logic blocks and circuitry configured to process signals that are transferred between digital baseband PHY 620 and antenna(s) 601. RF transceiver 610 includes transmitter circuitry 612 and receiver circuitry 614. Transmitter circuitry 612 includes digital-to-analog converters (DACs) and other circuitry configured to receive a modulated digital signal from TX BBP 622 and convert it to an analog RF signal for transmission through antenna(s) 601. Receiver circuitry 614 includes analog-to-digital converters (ADCs) and other circuitry configured to receive an analog RF signal from antenna(s) 601 and to convert it to a modulated digital signal that is sent to RX BBP 624.

In operation on the transmitter path, TX BBP 622 receives a series of data bytes from a component (e.g., CPU 652, host interface 658, etc.) through the one more buses 650. TX BBP 622 converts the received bytes of data into packets with preambles and tail-end CRCs, scrambles the packets, and serializes the scrambled packets into a stream of data bits. TX BBP 622 then phase-modulates the stream of data bits into a cosine (I) and sine (Q) portions of a modulated signal, and the modulated signal is sent to transmitter circuitry 612. Transmitter circuitry 612 uses DACs to convert the I and Q portions of the modulated signal into analog signals, combines the analog signals into an RF signal, and transmits the RF signal through antenna(s) 601.

In operation on the receiver path, receiver circuitry 614 receives an RF signal from antenna(s) 601, uses ADCs to convert the received RF signal into an I and Q portions of a modulated digital signal, and sends the modulated signal to RX BBP 624. RX BBP 624 recovers/tracks the timing intervals and the relative phases of the modulated signal and uses this timing information to demodulate the received signal into a stream of bits. RX BBP 624 then de-serializes the stream of bits, reassembles the bits into packets, and descrambles the packets. Any payload data in the packets is then converted into a series of bytes that is sent to a component (e.g., CPU 652, host interface 656, etc.) through the one or more buses 650.

In accordance with the techniques described herein, RX BBP 624 includes a quality indicator logic 430 that is configured to compute an EESM value based on the preamble(s) of the received packet(s) and to provide a wireless channel quality indicator to various components of wireless device 600 (e.g., such as CPU 652 and/or host interface 658). The quality indicator logic 430 of RX BBP 624 is similar to the quality indicator logic 430 illustrated in FIG. 4. In the embodiment illustrated in FIG. 6, quality indicator logic 430 is implemented as part of a programmable state machine (PSM), which is a micro-coded engine that includes a microcontroller highly optimized for flow control operations and provides low-level control of the various hardware circuitry necessary to implement the IEEE 802.11 specification(s). For example, in operation the PSM fetches instructions from microcode memory and uses shared memory to obtain operands for its instructions and scratch-pad memory (similar to a register bank) to store frequently accessed and temporary variables. The PSM exercises fine-grained control over the hardware circuitry by programming internal hardware registers (IHR), which are co-located with the hardware functions they control.

In operation, RX BBP 624 notifies quality indicator logic 430 when a wireless packet is received and descrambled. Quality indicator logic 430 validates the received packet and estimates (or otherwise determines, e.g., based on signal information from receiver circuitry 614) the signal strength for each sub-carrier of the wireless channel across a selected symbol in the preamble of the received packet. Quality indicator logic 430 also estimates the SNR of the wireless channel and accesses a LUT to find the β parameter value of the MCS for the received packet. Quality indicator logic 430 then computes an EESM value based on the signal strength of each subcarrier, the SNR data, and the β parameter value, and generates a quality indicator value that represents the quality of the wireless channel on which the packet was received. The quality indicator value may then be sent to host interface 658, CPU 652, or may be stored in RAM 656. In some embodiments, quality indicator logic 430 may compute the EESM value as the average of several EESM values that are computed based on multiple symbols from the preamble of the same packet and/or on symbols from the preambles of multiple packets. In some embodiments, quality indicator logic 430 may send or store the computed EESM value itself as the quality indicator value. In other embodiments, quality indicator logic 430 may convert the computed EESM value into a quality indicator value that corresponds to the channel quality (e.g., a good, medium, or bad).

In various embodiments, the techniques for guided placement of a wireless device described herein provide for improved throughput performance that results in higher data rates, less re-transmissions of data packets, and extension of the device's battery life. For example, in some embodiments an access point device on the up-link (UL) may be configured to check the channel quality of a wireless device using the EESM metric and to decide whether to hand over the wireless device to another access point device that has a better EESM for that device. In some embodiments, the EESM-based techniques described herein may also be used to address wireless design issues such as beamforming, switched antenna diversity, and use of polarized or directional antennas.

Various embodiments of the techniques for guided placement of a wireless device described herein may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for guided placement of wireless devices. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A wireless device comprising:
   a radio frequency (RF) transceiver configured to receive an RF signal transmitted over a wireless channel and to convert the RF signal to a modulated digital signal; and
   a baseband processor coupled to the RF transceiver, wherein the baseband processor is configured at least to:
   receive the modulated digital signal from the RF transceiver;
   extract a wireless packet from the modulated digital signal, wherein the wireless packet includes a preamble;
   compute an Exponential Effective SNR Mapping (EESM) value based on the preamble of the wireless packet, wherein the EESM value indicates a quality of the wireless channel at a current location of the wireless device; and
   provide a quality indicator based on the EESM value for the current location of the wireless device.

2. The wireless device of claim 1, wherein to compute the EESM value, the baseband processor is further configured to look up a β parameter value in a look-up table that stores pre-computed β parameter values for multiple modulation-and-coding schemes (MCSs).

3. The wireless device of claim 1, wherein to compute the EESM value, the baseband processor is further configured to estimate a Signal-to-Noise Ratio (SNR) value for the wireless channel.

4. The wireless device of claim 1, wherein to compute the EESM value, the baseband processor is further configured to use a signal strength value for each sub-carrier of the wireless channel.

5. The wireless device of claim 1, wherein the baseband processor is further configured to determine that the wireless packet is valid.

6. The wireless device of claim 1, wherein the wireless device further comprises a display, and wherein the quality indicator is displayed as a visual icon on the display.

7. The wireless device of claim 1, wherein the wireless device further comprises a plurality of Light Emitted Diodes (LEDs), and wherein the quality indicator is displayed on the plurality of LEDs.

8. The wireless device of claim 1, wherein the baseband processor is further configured to periodically re-compute the EESM value.

9. The wireless device of claim 1, wherein the baseband processor is further configured to compute a new EESM value and to provide a new quality indicator based on the new EESM value, when the current location of the wireless device is changed.

10. The wireless device of claim 1, wherein the wireless packet is a Null Data Packet (NDP) or a PHY Protocol Data Unit (PPDU).

11. A method comprising:
- receiving, over a wireless channel, a first wireless packet by a wireless device at a first location, wherein the first wireless packet includes a first preamble;
- computing, by the wireless device, a first Exponential Effective SNR Mapping (EESM) value based on the first preamble of the first wireless packet, wherein the first EESM value indicates a first quality of the wireless channel at the first location;
- providing, by the wireless device, a first quality indicator based on the first EESM value for the first location of the wireless device;
- receiving, over the wireless channel, a second wireless packet by the wireless device at a second location that is different from the first location, wherein the second wireless packet includes a second preamble;
- computing, by the wireless device, a second EESM value based on the second preamble of the second wireless packet, wherein the second EESM value indicates a second quality of the wireless channel at the second location; and
- providing, by the wireless device, a second quality indicator based on the second EESM value for the second location of the wireless device.

12. The method of claim 11, wherein computing the first EESM value and computing the second EESM value comprise looking up one or more β parameter values for one or more respective modulation-and-coding schemes (MCSs).

13. The method of claim 11, wherein computing the first EESM value comprises estimating a first Signal-to-Noise Ratio (SNR) value for the wireless channel, and wherein computing the second EESM value comprises estimating a second SNR value for the wireless channel.

14. The method of claim 11, wherein computing the first EESM value and computing the second EESM value comprise determining a signal strength value for each sub-carrier of the wireless channel.

15. The method of claim 11, further comprising:
- determining that that the first wireless packet is valid; and
- determining that the second wireless packet is valid.

16. The method of claim 11, wherein providing the first quality indicator and providing the second quality indicator comprise displaying a visual icon on a display of the wireless device.

17. The method of claim 11, wherein providing the first quality indicator and providing the second quality indicator comprise driving a plurality of Light Emitted Diodes (LEDs) of the wireless device.

18. The method of claim 11, wherein at least one of the first wireless packet and the second wireless packet is a Null Data Packet (NDP).

19. The method of claim 11, wherein at least one of the first wireless packet and the second wireless packet is a PHY Protocol Data Unit (PPDU).

20. The method of claim 11, further comprising periodically computing a current EESM value that indicates a current quality of the wireless channel at a current location of the wireless device.

* * * * *